(12) United States Patent
Tanaka et al.

(10) Patent No.: US 11,011,306 B2
(45) Date of Patent: May 18, 2021

(54) CERAMIC ELECTRONIC COMPONENT AND METHOD FOR PRODUCING CERAMIC ELECTRONIC COMPONENT

(71) Applicant: Murata Manufacturing Co., Ltd., Nagaokakyo (JP)

(72) Inventors: Hiromichi Tanaka, Nagaokakyo (JP); Yuki Takemori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 80 days.

(21) Appl. No.: 16/161,313

(22) Filed: Oct. 16, 2018

(65) Prior Publication Data

US 2019/0051458 A1    Feb. 14, 2019

Related U.S. Application Data

(63) Continuation of application No. PCT/JP2017/011422, filed on Mar. 22, 2017.

(30) Foreign Application Priority Data

Apr. 28, 2016    (JP) .............................. JP2016-091782

(51) Int. Cl.
*H01G 4/012*    (2006.01)
*H01G 4/30*    (2006.01)
(Continued)

(52) U.S. Cl.
CPC ........... *H01G 4/012* (2013.01); *H01G 4/0085* (2013.01); *H01G 4/30* (2013.01); *H01G 4/1218* (2013.01);
(Continued)

(58) Field of Classification Search
USPC ..... 361/303, 321.2, 305, 311, 312, 313, 322
See application file for complete search history.

(56) References Cited

U.S. PATENT DOCUMENTS

| 9,870,865 B2 | 1/2018 | Kanzaki |
| 2005/0152095 A1* | 7/2005 | Nakano ................ H01G 4/1227 361/321.4 |

(Continued)

FOREIGN PATENT DOCUMENTS

| JP | H0155566 B2 | 11/1989 |
| JP | H0864463 A  | 3/1996 |

(Continued)

OTHER PUBLICATIONS

International Search Report issued for PCT/JP2017/011422, dated Jun. 20, 2017.

(Continued)

*Primary Examiner* — Arun Ramaswamy
(74) *Attorney, Agent, or Firm* — Arent Fox LLP

(57) ABSTRACT

A ceramic electronic component that includes a ceramic insulator and an inner conductor layer disposed in the ceramic insulator. The inner conductor layer contains a metal and a metal oxide containing at least one first metal element selected from Ti, Mg, and Zr, first insulator regions that contain at least one second metal element selected from Ti, Mg, and Zr and that are discontinuous from the ceramic insulator and present in a dispersed state in the inner conductor layer, and a second insulator region containing a third metal element the same as the second metal element contained in the first insulator regions and present around the inner conductor layer.

20 Claims, 5 Drawing Sheets

CROSS-SECTIONAL VIEW TAKEN ALONG LINE B-B

(51) Int. Cl.
H01G 4/008 (2006.01)
H01G 4/12 (2006.01)
H01G 4/232 (2006.01)

(52) U.S. Cl.
CPC ......... *H01G 4/1236* (2013.01); *H01G 4/1245* (2013.01); *H01G 4/232* (2013.01)

(56) References Cited

U.S. PATENT DOCUMENTS

| | | | | |
|---|---|---|---|---|
| 2006/0198078 | A1* | 9/2006 | Miyauchi | H01G 4/30 361/305 |
| 2013/0258551 | A1 | 10/2013 | Kim et al. | |
| 2015/0318109 | A1* | 11/2015 | Lee | H01G 4/385 361/301.4 |
| 2016/0118191 | A1 | 4/2016 | Kanzaki | |
| 2016/0293331 | A1* | 10/2016 | Kitamura | H01G 4/12 |

FOREIGN PATENT DOCUMENTS

| | | | |
|---|---|---|---|
| JP | 2009170848 | A | 7/2009 |
| JP | 2013214698 | A | 10/2013 |
| JP | 2015053502 | A | 3/2015 |
| JP | 2015131982 | A | 7/2015 |

OTHER PUBLICATIONS

Written Opinion of the International Searching Authority issued for PCT/JP2017/011422, dated Jun. 20, 2017.

* cited by examiner

CROSS-SECTIONAL VIEW TAKEN ALONG LINE B-B

CROSS-SECTIONAL VIEW TAKEN ALONG LINE C-C

CERAMIC ELECTRONIC COMPONENT AND METHOD FOR PRODUCING CERAMIC ELECTRONIC COMPONENT

CROSS REFERENCE TO RELATED APPLICATIONS

The present application is a continuation of International application No. PCT/JP2017/011422, filed Mar. 22, 2017, which claims priority to Japanese Patent Application No. 2016-091782, filed Apr. 28, 2016, the entire contents of each of which are incorporated herein by reference.

FIELD OF THE INVENTION

The present invention relates to a ceramic electronic component and a method for producing the ceramic electronic component.

BACKGROUND OF THE INVENTION

A ceramic electronic component, such as a multilayer ceramic substrate or a multilayer ceramic capacitor, includes a ceramic insulator, an inner conductor buried in the ceramic insulator, and an outer conductor disposed on the outer surface of the ceramic insulator. Such a ceramic electronic component is typically obtained by forming a conductive paste film that is to be an inner conductor or an outer conductor on a green sheet containing the material powder of a ceramic insulator, forming a raw multilayer body by laminating a plurality of green sheets on which the conductive paste film is formed, and firing the raw multilayer body. In addition, to improve heat resistance and wettability, plating is performed to form a plating layer on the surface of the outer conductor.

When a ceramic electronic component is produced by the above method, the conductive paste and the green sheets may both shrink during firing. A difference in shrinking behavior may cause formation of voids between the inner conductor and the ceramic insulator. In such a case, ingress of a liquid, such as a plating solution, into the voids may occur. As a result, electrical characteristics of the ceramic electronic component may be degraded, thereby degrading the reliability.

Patent Document 1 and Patent Document 2 each provide a method to prevent the ingress of a liquid, such as a plating solution. Patent Document 1 provides a method in which pores in the ceramic surface portion of, for example, a sintered magnetic material or a dielectric are sealed with a synthetic resin by vacuum impregnation. Patent Document 2 provides a method including filling, with an organic solvent, voids in a ceramic body and a terminal electrode during a wet plating process and removing the organic solvent by volatilization after the process is complete.

Patent Document 1: Japanese Examined Patent Application Publication No. 1-55566
Patent Document 2: Japanese Unexamined Patent Application Publication No. 8-64463

SUMMARY OF THE INVENTION

In the methods described in Patent Document 1 and Patent Document 2, voids are sealed by post-treatment, and thus, the number of steps in producing a ceramic electronic component is increased. In addition, the resin material and the ceramic material in Patent Document 1 differ in terms of thermal expansion coefficient. Thus, when thermal shock is applied to the ceramic electronic component, delamination or cracking may occur between both materials. In the method in which an organic solvent is used in Patent Document 2, voids are temporarily sealed during plating. Thus, after the organic solvent is volatilized, voids in which ingress of a liquid may occur remain.

The present invention has been developed to solve the foregoing problems and provides a ceramic electronic component in which voids are unlikely to be formed between an inner conductor layer and a ceramic insulator and that does not allow ingress of a liquid from the outside, and a method for producing the ceramic electronic component.

To achieve the above objects, the ceramic electronic component according to an aspect of the present invention includes a ceramic insulator and an inner conductor layer disposed in the ceramic insulator. The inner conductor layer contains a metal and a metal oxide including at least one first metal element selected from a group consisting of Ti, Mg, and Zr, first insulator regions that contain at least one second metal element selected from a group consisting of Ti, Mg, and Zr and that are discontinuous from the ceramic insulator and present in a dispersed state in the inner conductor layer, and a second insulator region containing a third metal element the same as the second metal element contained in the first insulator regions and present around the inner conductor layer.

In the ceramic electronic component according to the present invention, the first insulator regions and the second insulator region that contain at least one metal element selected from a group consisting of Ti, Mg, and Zr are respectively present in the inner conductor layer and around the inner conductor layer. This indicates that when firing is performed to produce the ceramic electronic component, a component of the metal oxide contained in the inner conductor layer is not diffused in the ceramic insulator and remains in the inner conductor layer and between the inner conductor layer and the ceramic insulator. This suppresses shrinkage of the inner conductor layer during firing, and thus, voids are unlikely to be formed between the inner conductor layer and the ceramic insulator.

As described above, in the ceramic electronic component according to the present invention, formation of voids is suppressed between the inner conductor layer and the ceramic insulator. Thus, ingress of a liquid, such as a plating solution, from the outside is prevented. As a result, occurrence of electrochemical migration is suppressed, and the number of short circuits between conductors is reduced. This leads to improvement of reliability. In addition, the occurrence of defects, such as expansion of an outer conductor, solder burst, formation of voids in a solder, and discoloring of an outer conductor, that are caused by ingress of a liquid and that cause problems when a ceramic electronic component is mounted is reduced.

In the ceramic electronic component according to the present invention, the ceramic insulator preferably contains a fourth metal element the same as the second metal element contained in the first insulator regions and the third metal element contained in the second insulator region.

The ceramic insulator preferably contains a fourth metal element the same as the second metal element contained in the first insulator regions and the third metal element contained in the second insulator region, so that the sintering behavior of the inner conductor layer is similar to the sintering behavior of the ceramic insulator. Thus, formation of voids is further suppressed between the inner conductor layer and the ceramic insulator.

When the ceramic insulator contains a fourth metal element the same as the second metal element contained in the first insulator regions and the third metal element contained in the second insulator region, the concentration of the fourth metal element contained in the ceramic insulator is preferably lower than the concentration of the second metal element in the first insulator regions and the concentration of the third metal element in the second insulator region.

According to this, even in a case where the ceramic insulator contains a metal element the same as the metal element contained in the first insulator regions and the second insulator region, a component of the metal oxide contained in the inner conductor layer remains in the inner conductor layer and between the inner conductor layer and the ceramic insulator. Therefore, shrinkage of the inner conductor layer is suppressed during firing, and voids are unlikely to be formed between the inner conductor layer and the ceramic insulator.

In the ceramic electronic component according to the present invention, the inner conductor layer is preferably exposed at the surface of the ceramic insulator. It is preferable that the ceramic electronic component according to the present invention further include an outer conductor disposed on a surface of the ceramic insulator and that the inner conductor layer be covered with the outer conductor.

Even if the ceramic electronic component has such a structure that easily allows ingress of a liquid from the outside, formation of voids is suppressed between the inner conductor layer and the ceramic insulator, and thus, ingress of a liquid, such as a plating solution, from the outside is prevented.

In the ceramic electronic component according to the present invention, a void generated in a portion of the lower surface of the inner conductor layer that is in contact with the upper surface of the inner conductor layer preferably has a length of 100 μm or less.

Between the inner conductor layer and the ceramic insulator, voids are likely to be formed in a portion of the lower surface of the inner conductor layer that is in contact with the upper surface of the inner conductor layer. In the ceramic electronic component according to the present invention, formation of voids in such a portion is suppressed.

A method for producing a ceramic electronic component according to an aspect of the present invention includes preparing a plurality of green sheets containing a material powder of a ceramic insulator, preparing a conductive paste containing a metal powder, a metal oxide powder or a metal oxide precursor powder, and an organic vehicle, the metal oxide powder or the metal oxide precursor powder containing at least one metal element selected from a group consisting of Ti, Mg, and Zr, forming a conductive paste film by applying the conductive paste to a main surface of at least one of the plurality of green sheets, producing a raw multilayer body in which the conductive paste film is formed between the plurality of green sheets when the plurality of green sheets are laminated, and firing the raw multilayer body.

In the method according to the present invention for producing a ceramic electronic component, the metal powder is sintered before a component of the metal oxide derived from the metal oxide powder or the metal oxide precursor powder is diffused in the ceramic insulator. Accordingly, the metal oxide remains in the inner conductor layer and between the inner conductor layer and the ceramic insulator, thereby forming the above-described first insulator regions and the second insulator region. This suppresses shrinkage of the inner conductor layer during firing. As a result, a ceramic electronic component in which voids are unlikely to be formed between the inner conductor layer and the ceramic insulator and that does not allow ingress of a liquid from the outside is produced.

In the method according to the present invention for producing a ceramic electronic component, the metal oxide powder or the metal oxide precursor powder preferably has a specific surface area of 6 $m^2/g$ to 90 $m^2/g$.

The metal oxide powder or the metal oxide precursor powder contained in the conductive paste has a specific surface area in the above range, so that the metal oxide powder particles or the metal oxide precursor powder particles are likely to be retained among the sintered metal powder particles. In other words, a component of the metal oxide contained in the inner conductor layer is unlikely to be diffused in the ceramic insulator, and thus, shrinkage of the inner conductor layer is further suppressed during firing.

In the method according to the present invention for producing a ceramic electronic component, when a particle diameter calculated from the specific surface area of the metal oxide powder or the metal oxide precursor powder is denoted by $D_{Osf}$ (nm) and a volume-based median diameter of the metal powder is denoted by $D_{M50}$ (nm), it is preferable that $2.28 \leq S\ D_{M50}/D_{Osf} \leq 105.5$ is satisfied.

The particle diameter of the metal oxide powder or the metal oxide precursor powder is smaller than the particle diameter of the metal powder, so that the metal oxide powder particles or the metal oxide precursor powder particles are likely to be retained among the sintered metal powder particles. In other words, a component of the metal oxide contained in the inner conductor layer is unlikely to be diffused in the ceramic insulator, and thus, shrinkage of the inner conductor layer is further suppressed during firing.

In the method according to the present invention for producing a ceramic electronic component, the initial sintering temperature of the metal powder is preferably equal to or lower than the initial sintering temperature of the plurality of green sheets.

If sintering of the green sheet starts at a low temperature, a liquid-phase component of the ceramic insulator reacts with a metal oxide in the conductive paste, and thus, it is possible that neither the first insulator regions nor the second insulator region is formed. Therefore, the initial sintering temperature of the metal powder is set to be equal to or lower than the initial sintering temperature of the plurality of green sheets, thereby forming the first insulator regions and the second insulator region reliably.

In the method according to the present invention for producing a ceramic electronic component, the material powder of the ceramic insulator preferably contains $SiO_2$, $Al_2O_3$, and a Ba compound.

The above material powder can be sintered at a firing temperature of 1000° C. or lower and can be thus cofired with Ag or Cu.

The present invention provides a ceramic electronic component in which voids are unlikely to be formed between an inner conductor layer and a ceramic insulator and that does not allow ingress of a liquid from the outside, and a method for producing the ceramic electronic component.

BRIEF DESCRIPTION OF THE DRAWINGS

FIG. 4, part B illustrates a reflected electron image and an element Ti mapping image of the vicinity of an inner conductor layer of a ceramic electronic component S-2. FIG. 4, part C illustrates a reflected electron image and an element Ti mapping image of the vicinity of an inner conductor layer of a ceramic electronic component S-3. FIG. 4, part D illustrates a reflected electron image and an element Ti mapping image of the vicinity of an inner conductor layer of a ceramic electronic component S-4.

FIG. 5, part B illustrates a reflected electron image and an element Ti mapping image of the whole body of the ceramic electronic component S-2. FIG. 5, part C illustrates a reflected electron image and an element Ti mapping image of the whole body of the ceramic electronic component S-3. FIG. 5, part D illustrates a reflected electron image and an element Ti mapping image of the whole body of the ceramic electronic component S-4.

FIG. 6, part B illustrates a reflected electron image and an element Zr mapping image of the vicinity of an inner conductor layer of a ceramic electronic component S-12.

DETAILED DESCRIPTION OF THE PREFERRED EMBODIMENTS

Hereinafter, according to the present invention, a ceramic electronic component and a method for producing the ceramic electronic component will be described.

However, the present invention is not limited to the following structures. Various modifications may be appropriately made as long as the gist of the present invention is not changed.

The present invention also includes a combination of two or more preferred structures of the present invention that are described herein.

Embodiments described hereinafter are illustrative. It is to be understood that a combination or partial replacement of structures described in different embodiments is possible.

A multilayer ceramic substrate will be described as an example of an embodiment of the ceramic electronic component according to the present invention.

Figure 1:
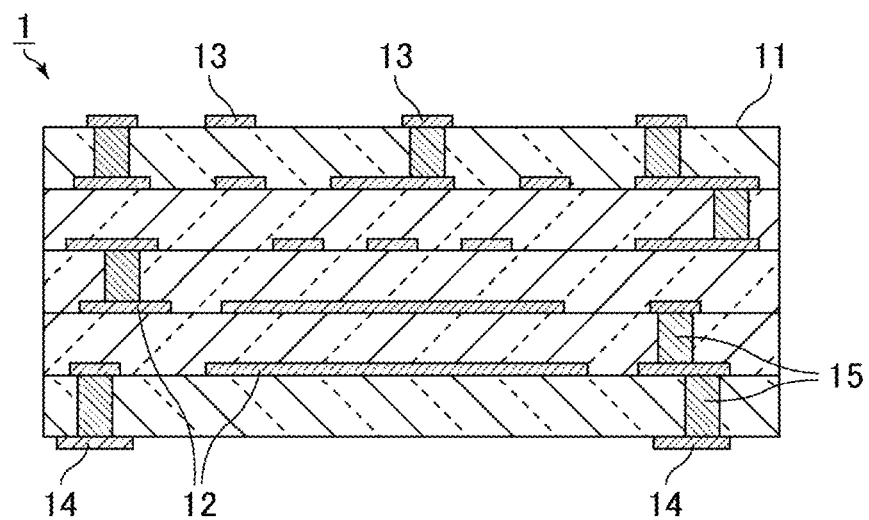
FIG. 1 is a schematic cross-sectional view of an example of a multilayer ceramic substrate.

FIG. 1 is a schematic cross-sectional view of an example of the multilayer ceramic substrate.

A multilayer ceramic substrate 1, illustrated in FIG. 1, includes a ceramic insulator 11 including a plurality of ceramic layers laminated on each other and inner conductor layers 12 disposed in the ceramic insulator 11. The inner conductor layers 12 are disposed as wiring conductors between the ceramic layers and formed substantially parallel to the main surface of the ceramic insulator 11.

In addition to the inner conductor layers 12, outer conductor layers 13, which are disposed on one main surface of the multilayer ceramic substrate 1, outer conductor layers 14, which are disposed on the other main surface of the multilayer ceramic substrate 1, and via conductors 15, which are electrically connected to any of the inner conductor layers 12, the outer conductor layers 13, and the outer conductor layers 14 and which are disposed so as to pass through a ceramic layer in a thickness direction, are disposed as wiring conductors in the multilayer ceramic substrate 1.

A chip component (not shown) is mounted on one main surface of the multilayer ceramic substrate 1 while being electrically connected to the outer conductor layers 13. The chip component mounted on the multilayer ceramic substrate 1 may be the ceramic electronic component according to the present invention. The outer conductor layers 14 formed on the other main surface of the multilayer ceramic substrate 1 are used as electrical connecting members when the multilayer ceramic substrate 1 on which the chip component is mounted is installed on a motherboard (not shown).

The ceramic electronic component according to aspects of the present invention can be used not only as a multilayer ceramic substrate, but also as a chip component mounted on a multilayer ceramic substrate. An example of such a chip component is a multilayer ceramic electronic component, such as a multilayer ceramic capacitor, a multilayer inductor, or a multilayer filter. The ceramic electronic component according to the present invention can also be used as any of various types of ceramic electronic components other than multilayer ceramic electronic components.

Figure 2:
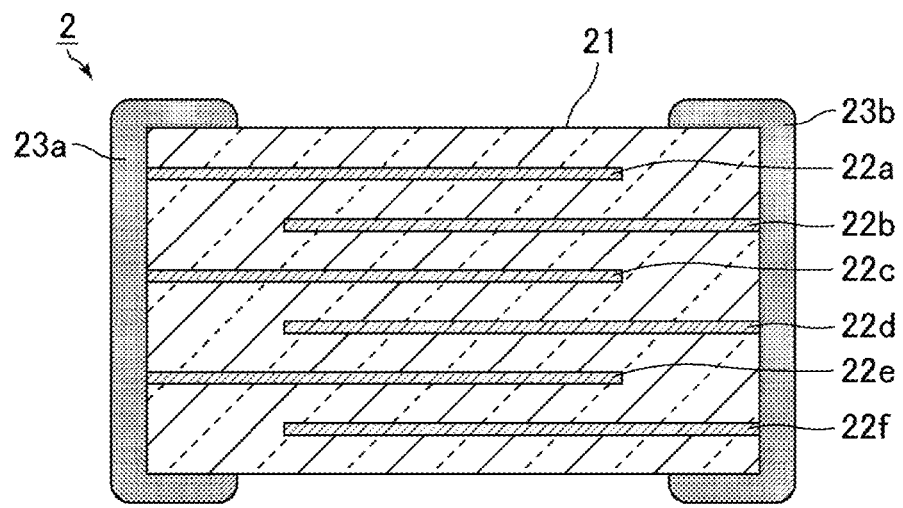
FIG. 2 is a schematic cross-sectional view of an example of a multilayer ceramic capacitor.

FIG. 2 is a schematic cross-sectional view of an example of the multilayer ceramic capacitor.

A multilayer ceramic capacitor 2, illustrated in FIG. 2, includes a ceramic insulator 21 including a plurality of dielectric layers laminated on each other and inner layer electrodes 22a to 22f disposed in the ceramic insulator 21. The inner layer electrodes 22a to 22f serve as inner conductor layers. The inner layer electrodes 22a to 22f are disposed between the dielectric layers and formed substantially parallel to the main surface of the ceramic insulator 21. An outer electrode 23a is formed on one end surface of the ceramic insulator 21 and serves as an outer conductor. An outer electrode 23b is formed on the other end surface of the ceramic insulator 21 and serves as an outer conductor.

The inner layer electrodes 22a to 22f are arranged in parallel in a laminating direction. The inner layer electrodes 22a, 22c, and 22e are exposed at one end surface of the ceramic insulator 21 and electrically connected to the outer electrode 23a. The inner layer electrodes 22b, 22d, and 22f are exposed at the other end surface of the ceramic insulator 21 and electrically connected to the outer electrode 23b. Electrostatic capacitance is generated between the opposing surfaces of the inner layer electrodes 22a, 22c, and 22e and the inner layer electrodes 22b, 22d, and 22f.

The ceramic electronic component according to the present invention preferably has a structure in which an inner conductor layer is exposed at the surface of the ceramic insulator or a structure in which an inner conductor layer is covered with an outer conductor.

In the ceramic electronic component according to the present invention, an outer conductor is disposed on the surface of the ceramic insulator and may be the above-described outer electrode or a metal case disposed for electromagnetic shielding.

The ceramic insulator constituting the ceramic electronic component according to the present invention preferably contains a low temperature co-fired ceramic material.

Among ceramic materials, a low temperature co-fired ceramic material is a material that can be sintered at a firing temperature of 1000° C. or lower and that can be cofired with Ag or Cu.

Examples of the low temperature co-fired ceramic material contained in the ceramic insulator include glass composite-based low temperature co-fired ceramic materials produced by mixing borosilicate glass with a ceramic material, such as quartz, alumina, or forsterite; glass-ceramics-based low temperature co-fired ceramic materials produced by using $ZnO$—$MgO$—$Al_2O_3$—$SiO_2$-based glass-ceramics; and non-glass-based low temperature co-fired ceramic materials produced by using $BaO$—$Al_2O_3$—$SiO_2$-based ceramic materials or $Al_2O_3$—$CaO$—$SiO_2$—$MgO$—$B_2O_3$-based ceramic materials.

The inner conductor layer constituting the ceramic electronic component according to the present invention contains a metal and a metal oxide.

Examples of the metal contained in the inner conductor layer include Au, Ag, Cu, Pt, Ta, W, Ni, Fe, Cr, Mo, Ti, Pd, and Ru and alloys containing mainly one of the above metals. The inner conductor layer preferably contains a metal that is Au, Ag, or Cu and more preferably Ag or Cu. Au, Ag, and Cu have low resistance and are thus suitable, in particular, for a ceramic electronic component used for high-frequency applications.

The metal oxide contained in the inner conductor layer contains at least one metal element selected from a group consisting of Ti, Mg, and Zr. Representative examples of such a material include $TiO_2$, MgO, and $ZrO_2$. One or two or more of such metal oxides may be included. The inner conductor layer preferably contains a metal oxide containing the element Ti, such as $TiO_2$.

In the ceramic electronic component according to the present invention, first insulator regions discontinuous from the ceramic insulator are present in a dispersed state in the inner conductor layer, and a second insulator region is present around the inner conductor layer. The first insulator regions contain at least one metal element selected from a group consisting of Ti, Mg, and Zr. The second insulator region contains a metal element that is the same as the metal element contained in the first insulator regions.

The metal element contained in the first insulator regions and the second insulator region is the same as the metal element constituting the metal oxide contained in the inner conductor layer. In other words, when the metal oxide contained in the inner conductor layer is a metal oxide containing Ti, such as $TiO_2$, the metal element contained in the first insulator regions and the second insulator region is Ti. When the metal oxide contained in the inner conductor layer is a metal oxide containing Mg, such as MgO, the metal element contained in the first insulator regions and the second insulator region is Mg. When the metal oxide contained in the inner conductor layer is a metal oxide containing Zr, such as $ZrO_2$, the metal element contained in the first insulator regions and the second insulator region is Zr. When two or more metal oxides are contained in the inner conductor layer, at least one of the metal oxides is required to be contained in the first insulator regions and the second insulator region.

Figure 3A:
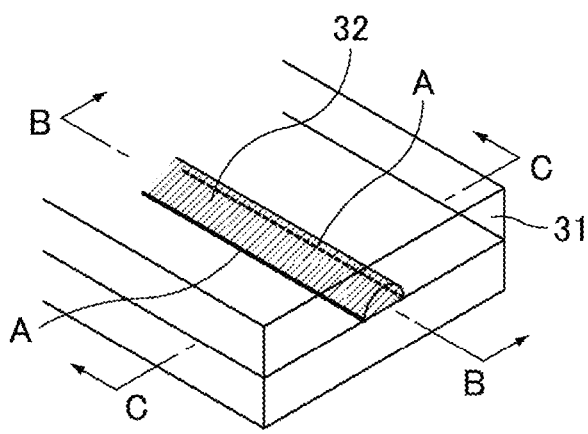
FIG. 3(a) is a schematic perspective view of the vicinity of an inner conductor layer of a ceramic electronic component according to the present invention.
Figure 3B:
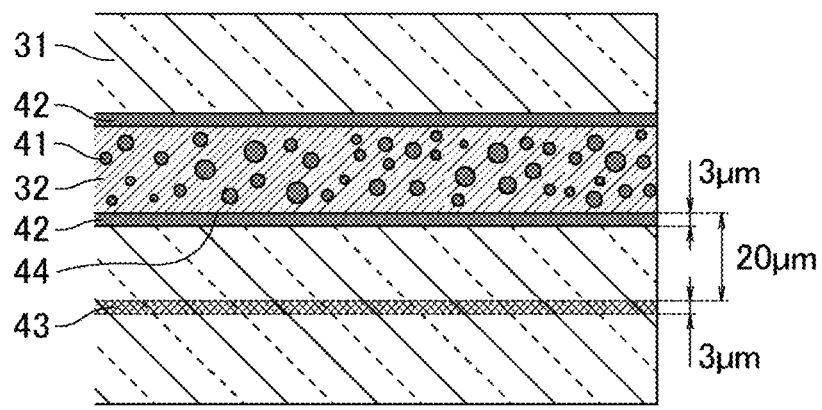
FIG. 3(b) is a cross-sectional view taken along line B-B in FIG. 3(a).
Figure 3C:
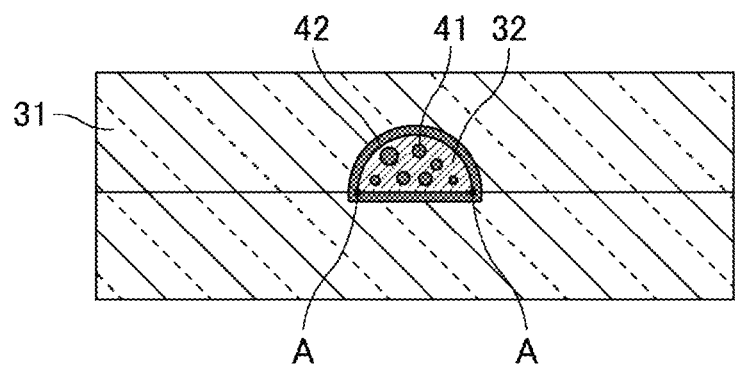
FIG. 3(c) is a cross-sectional view taken along line C-C in FIG. 3(a).

FIG. 3(a) is a schematic perspective view of the vicinity of an inner conductor layer of the ceramic electronic component according to the present invention. FIG. 3(b) is a cross-sectional view taken along line B-B in FIG. 3(a). FIG. 3(c) is a cross-sectional view taken along line C-C in FIG. 3(a). FIG. 3(a) and FIG. 3(b) illustrate an example in which one end of an inner conductor layer 32 is exposed at the surface of a ceramic insulator 31.

As illustrated in FIG. 3(b) and FIG. 3(c), first insulator regions 41 discontinuous from the ceramic insulator 31 are present in a dispersed state in the inner conductor layer 32, and a second insulator region 42 is present around the inner conductor layer 32.

In the present description, when it is confirmed by elemental analysis using wavelength-dispersive X-ray spectroscopy (WDX) that at least one metal element selected from a group consisting of Ti, Mg, and Zr is present in the inner conductor layer, the regions where the metal element is present are the first insulator regions. When it is confirmed that at least one metal element selected from a group consisting of Ti, Mg, and Zr is present around the inner conductor layer, a region where the metal element is present is the second insulator region.

In the ceramic electronic component according to the present invention, the first insulator regions are discontinuous from the ceramic insulator. In other words, the first insulator regions do not connect to the ceramic insulator, which is present outside the inner conductor layer. The first insulator regions are surrounded by a metal in the inner conductor layer and independent from the ceramic insulator. The first insulator regions are preferably a plurality of small regions that are present in a dispersed state. The size of each small region is not particularly limited. The small regions may have the same size or different sizes.

In the ceramic electronic component according to the present invention, it is preferable that the second insulator region be fully present around the inner conductor layer; however, the second insulator region may be partly absent around the inner conductor layer.

The second insulator region is required to be present between the inner conductor layer and the ceramic insulator. In particular, the second insulator region is preferably present in a region having a thickness of 3 μm between the inner conductor layer and the ceramic insulator. FIG. 3(b) illustrates an example in which the second insulator region 42 is present in a region having a thickness of 3 μm between the inner conductor layer 32 and the ceramic insulator 31.

In the ceramic electronic component according to the present invention, the ceramic insulator preferably contains a metal element that is the same as the metal element contained in the first insulator regions and the second insulator region. In other words, when the metal element contained in the first insulator regions and the second insulator region is Ti, the ceramic insulator preferably contains the element Ti. When the metal element contained in the first regions and the second insulator region is Mg, the ceramic insulator preferably contains the element Mg. When the metal element contained in the first insulator regions and the second insulator region is Zr, the ceramic insulator preferably contains the element Zr. When two or more metal elements are contained in the first insulator regions and the second insulator region, at least one of the metal elements is required to be contained in the ceramic insulator.

In the ceramic electronic component according to the present invention, the concentration of the metal element contained in the ceramic insulator is preferably lower than the concentration of the metal element in the first insulator regions and the concentration of the metal element in the second insulator region.

In the present description, the concentration of the metal element contained in the ceramic insulator refers to the concentration of the metal element in a region (region 43 in FIG. 3(b)) that has a thickness of 3 μm and that is separated by 20 μm from the interface between the inner conductor layer and the second insulator region.

When the intensity of at least one metal element selected from a group consisting of Ti, Mg, and Zr in the region, which is measured by the above-described WDX, is lower than the intensity of the metal element in the first insulator regions and the second insulator region, the concentration of the metal element contained in the ceramic insulator is lower than the concentration of the metal element in the first insulator regions and the concentration of the metal element in the second insulator region.

The interface between the inner conductor layer and the second insulator region refers to a portion in which an element (e.g., Cu) of the metal component contained in the inner conductor layer has an intensity of less than 600 when the elemental analysis is performed by using WDX under the conditions described in Examples.

In the ceramic electronic component according to the present invention, a void generated in portions (portions A in FIG. 3(a) and FIG. 3(c)) of the lower surface of the inner conductor layer that are in contact with the upper surface of the inner conductor layer preferably has a length of 100 μm or less. In particular, the void preferably has a length of 0 μm. In other words, it is preferable that no voids be generated in the portions.

In the present description, a surface on which the inner conductor layer is formed is referred to as "the lower surface of the inner conductor layer", and other surfaces are collectively referred to as "the upper surface of the inner conductor layer". For example, when a cuboid inner conductor layer is formed on a ceramic layer, the bottom surface of the inner conductor layer, which is in contact with the ceramic layer, corresponds to "the lower surface of the inner conductor layer", and side surfaces and a plane opposing the bottom surface, as a whole, correspond to "the upper surface of the inner conductor layer".

As described in Examples, the length of the void is determined by impregnating the ceramic electronic component with a fluorescent solution and then measuring the length of a portion in which ingress of the fluorescent solution has occurred between the inner conductor layer and the ceramic insulator.

The ceramic electronic component according to the present invention is preferably produced as follows.

First, a plurality of green sheets containing the material powder of the ceramic insulator are prepared.

A green sheet is produced by forming a ceramic material powder, such as a low temperature co-fired ceramic material, and a slurry containing an organic binder and a solvent into a sheet shape by, for example, a doctor blade method. The slurry may contain various additives, such as a dispersant and a plasticizer.

The material powder of the ceramic insulator preferably contains $SiO_2$, $Al_2O_3$, and a Ba compound. In addition, the material powder of the ceramic insulator more preferably contains a metal element that is the same as the metal element contained in the conductive paste described herein later. For example, a powder containing $SiO_2$, $Al_2O_3$, and $BaCO_3$ is preferably used as the ceramic material powder contained in the slurry, and a powder containing $SiO_2$, $Al_2O_3$, $BaCO_3$, and at least one selected from a group consisting of $TiO_2$, $Mg(OH)_2$, and $ZrO_2$ is more preferably used. $BaCO_3$ is changed to BaO and $Mg(OH)_2$ is changed to MgO by heating. A MgO powder may be used instead of a $Mg(OH)_2$ powder.

Separately from the above, a conductive paste containing a metal powder, a metal oxide powder or a metal oxide precursor powder, and an organic vehicle is prepared.

The metal powder is preferably a Cu powder. Examples of the organic vehicle include an ethylcellulose-based resin, an acryl resin, and a polyvinyl butyral resin. Among such resins, an ethylcellulose-based resin is preferably used.

The metal oxide powder or the metal oxide precursor powder contains at least one metal element selected from a group consisting of Ti, Mg, and Zr. The metal oxide precursor is a compound that is changed to a metal oxide by heating. For example, a powder containing at least one selected from a group consisting of $TiO_2$, $Mg(OH)_2$, and $ZrO_2$ may be used as the metal oxide powder or the metal oxide precursor powder. Among the above compounds, a $TiO_2$ powder is preferably used as the metal oxide powder. $Mg(OH)_2$ is changed to MgO by heating. A MgO powder may be used instead of a $Mg(OH)_2$ powder.

The metal oxide powder or the metal oxide precursor powder preferably has a specific surface area (SSA) of 6 $m^2/g$ or more, more preferably 20 $m^2/g$ or more, and still more preferably 50 $m^2/g$ or more. The metal oxide powder or the metal oxide precursor powder preferably has a specific surface area of 90 $m^2/g$ or less. In particular, when a $TiO_2$ powder is used as the metal oxide powder, the $TiO_2$ powder preferably has a specific surface area in the above range.

The specific surface area of the metal oxide powder or the metal oxide precursor powder is measured by using an SSA measuring apparatus (product name Macsorb (registered trademark), manufactured by Mountech Co., Ltd.) that uses a BET (Brunauer, Emmet and Teller's equation) single point method using $N_2$ gas.

When the particle diameter calculated from the specific surface area of the metal oxide powder or the metal oxide precursor powder is denoted by $D_{Osf}$ (nm) and the volume-based median diameter of the metal powder is denoted by $D_{M50}$ (nm), it is preferable that $2.28 \leq D_{M50}/D_{Osf} \leq 105.5$ be satisfied, and more preferable that $18.8 \leq D_{M50}/D_{Osf} \leq 105.5$ be satisfied. In particular, when a $TiO_2$ powder is used as the metal oxide powder, $D_{M50}/D_{Osf}$ is preferably in the above range.

When the specific surface area of the metal oxide powder or the metal oxide precursor powder, which is measured by a BET single point method, is denoted by s ($m^2/g$) and the density of the component of the metal oxide powder or the metal oxide precursor powder is denoted by ρ ($g/cm^3$), the particle diameter $D_{Osf}$ (nm) calculated from the specific surface area of the metal oxide powder or the metal oxide precursor powder is a value calculated using the formula "$D_{Osf} = (6 \times 10^3)/(s \times \rho)$".

The volume-based median diameter $D_{M50}$ (nm) of the metal powder is a value measured by using a laser diffraction/scattering-type particle-size-distribution measuring apparatus (LA series, manufactured by HORIBA, Ltd.).

The amount of the metal oxide powder or the metal oxide precursor powder in the conductive paste is preferably 1.5 weight % or more, more preferably 2.0 weight % or more, and still more preferably 2.5 weight % or more, and preferably 4.0 weight % or less and more preferably 3.5 weight % or less.

The initial sintering temperature of the metal powder is preferably equal to or lower than the initial sintering temperature of the green sheet.

Here, regarding the initial sintering temperature of the metal powder and the green sheet, when a tangent to a TMA curve at an inflection point in the main shrinkage temperature region, that is, in a temperature region in which shrinkage is largest, in a temperature range of 400° C. or higher and 1000° C. or lower and a tangent to the TMA curve at a point in the range of 600° C. or higher and 700° C. or lower are drawn by using a thermomechanical analyzer (TMA), the initial sintering temperature of the metal powder and the green sheet is a temperature indicated by the intersection point of the two lines.

The conductive paste is applied to the main surface of at least one of the green sheets to form a conductive paste film that is to be an inner conductor layer. If necessary, a conductive paste film that is to be an outer conductor layer is formed on a specific green sheet, and a conductive paste body that is to be a via conductor is formed in the specific green sheet. The conductive paste for forming an outer conductor layer and a via conductor is preferably the conductive paste for forming an inner conductor layer.

Subsequently, a plurality of green sheets are laminated on each other to produce a raw multilayer body in which a conductive paste film is formed between the green sheets.

The raw multilayer body is preferably produced by laminating green sheets that have been preliminarily formed into a sheet shape, as described above. The raw multilayer body may be produced by repeatedly forming a ceramic slurry into a sheet shape on the same portion.

The raw multilayer body is then fired. This provides a ceramic electronic component including a ceramic insulator and an inner conductor layer disposed in the ceramic insulator.

In the method according to the present invention for producing a ceramic electronic component, the metal powder is sintered before a component of the metal oxide derived from the metal oxide powder or the metal oxide precursor powder is diffused in the ceramic insulator. Accordingly, the metal oxide remains in the inner conductor layer and between the inner conductor layer and the ceramic insulator, thereby forming the above-described first insulator regions and the second insulator region. This suppresses shrinkage of the inner conductor layer during firing. As a result, a ceramic electronic component in which voids are unlikely to be formed between the inner conductor layer and the ceramic insulator and that does not allow ingress of a liquid from the outside is produced.

In the method according to the present invention for producing a ceramic electronic component, preparing a restraint green sheet containing mainly an inorganic material (e.g., $Al_2O_3$) that is not substantially sintered at the sintering temperature of a raw multilayer body and firing the raw multilayer body with the restraint green sheet disposed on the outermost surface of the raw multilayer body may be performed. In this case, the restraint green sheet is not substantially sintered during firing and thus does not shrink. This provides an effect of suppressing shrinkage of the multilayer body in a direction of the main surface. As a result, size accuracy of the ceramic electronic component is improved.

When the ceramic electronic component according to the present invention includes an outer conductor, such as an outer electrode, a plating layer may be formed on the surface of the outer conductor after firing by applying electroplating or electroless plating thereto.

Examples

Hereinafter, Examples that specifically disclose the ceramic electronic component according to the present invention and the method according to the present invention for producing the ceramic electronic component will be described. The present invention is not limited to such Examples.

[Production of Green Sheet]

A $SiO_2$ powder, an $Al_2O_3$ powder, a $BaCO_2$ powder, a $TiO_2$ powder, a $Mg(OH)_2$ powder, and a $ZrO_2$ powder were prepared as starting materials. Such powders had an average particle diameter (D50) of 2.0 μm or less. The starting material powders were weighed according to predetermined compositional proportions, mixed together and ground in a wet state, and dried to obtain a mixture. The obtained mixture was subjected to heat treatment in a reducing atmosphere to obtain a material powder for forming a green sheet for a ceramic insulator. This heat treatment changed $BaCO_3$ to BaO and $Mg(OH)_2$ to MgO.

An organic binder, a dispersant, and a plasticizer were added to the material powder, mixed together, and ground such that the material powder has an average particle diameter (D50) of 1.5 μm or less to provide a ceramic slurry. Next, the ceramic slurry was formed into a sheet shape on a base film by a doctor blade method and dried to obtain a green sheet. The thickness of the green sheet was adjusted to be 20 μm after firing.

[Production of Conductive Paste]

Metal powders shown in Table 1, metal oxide powders shown in Table 2, and an organic vehicle shown in Table 3 were prepared as starting materials.

TABLE 1

| Metal powder number | Type | $D_{M10}$ [nm] | $D_{M50}$ [nm] | $D_{M90}$ [nm] | SSA [m²/g] | Density [g/cm³] |
| --- | --- | --- | --- | --- | --- | --- |
| K-1 | Cu | 400 | 600 | 1000 | 1.7 | 8.4 |
| K-2 | Cu | 500 | 800 | 1300 | 1.8 | 8.6 |
| K-3 | Cu | 700 | 1000 | 1600 | 1.3 | 8.6 |
| K-4 | Cu | 1000 | 1900 | 3000 | 0.6 | 8.9 |
| K-5 | Cu | 1000 | 1800 | 2900 | 0.7 | 8.9 |

TABLE 2

| Metal oxide powder number | Type | Density [g/cm³] | SSA [m²/g] | $D_{Osf}$ [nm] |
| --- | --- | --- | --- | --- |
| OX-1 | $TiO_2$ | 3.8 | 6 | 263 |
| OX-2 | $TiO_2$ | 3.8 | 20 | 79 |
| OX-3 | $TiO_2$ | 3.8 | 49 | 32 |
| OX-4 | $TiO_2$ | 3.8 | 90 | 18 |
| OX-5* | $Al_2O_3$ | 4.0 | 49 | 31 |
| OX-6* | $SiO_2$ | 2.7 | 104 | 21 |
| OX-7 | MgO | 3.7 | 49 | 33 |
| OX-8 | $ZrO_2$ | 5.5 | 35 | 31 |

*Out of the scope of the present invention

TABLE 3

| Organic vehicle number | Composition [weight %] | | | Density [g/cm³] |
| --- | --- | --- | --- | --- |
| | Ethyl cellulose | Terpineol | Diethylene glycol monobutyl ether | |
| OV-1 | 16 | 42 | 42 | 0.95 |

The particle diameter ($D_{M10}$, $D_{M50}$, and $D_{M90}$) of the metal powders in Table 1 was measured by using a laser diffraction/scattering particle size distribution measuring apparatus (LA series, manufactured by HORIBA, Ltd.). The solvent for the measurement was a mixture of ethyl alcohol and isopropyl alcohol. The SSA (specific surface area) of metal powders and metal oxide powders in Table 1 and Table 2 was measured by using an SSA measuring apparatus (product name Macsorb (registered trademark), manufactured by Mountech Co., Ltd.) that uses a BET single point method using $N_2$ gas. The density of the metal powders and the metal oxide powders in Table 1 and Table 2 was measured by using a dry-process pycnometer (product name, AccuPyc series, manufactured by Shimadzu Corporation). The density of the organic vehicles in Table 3 was measured by using a specific gravity cup (manufactured by YASUDA SEIKI SEISAKUSHO, LTD.).

The starting materials shown in Tables 1 to 3 were blended together in the respective compositional proportions shown in Table 4. Then, dispersion treatment was performed by using a three-roller mill to obtain conductive pastes P-1 to P-15.

Table 5 shows the measurement conditions of WDX.

TABLE 5

| Apparatus | Conditions | |
|---|---|---|
| Electro-optical system | Irradiation current | $5 \times 10^{-8}$ A |
| | Accelerating voltage | 15 kV |
| | Scanning method | Stage scan (one direction) |
| | Dwell Time | 40 ms |
| | Number of pixels | 256 × 256 |
| | Pixel size | 0.18 μm |
| Spectrometer | Analyzing crystal | LiFH |

Figure 4:
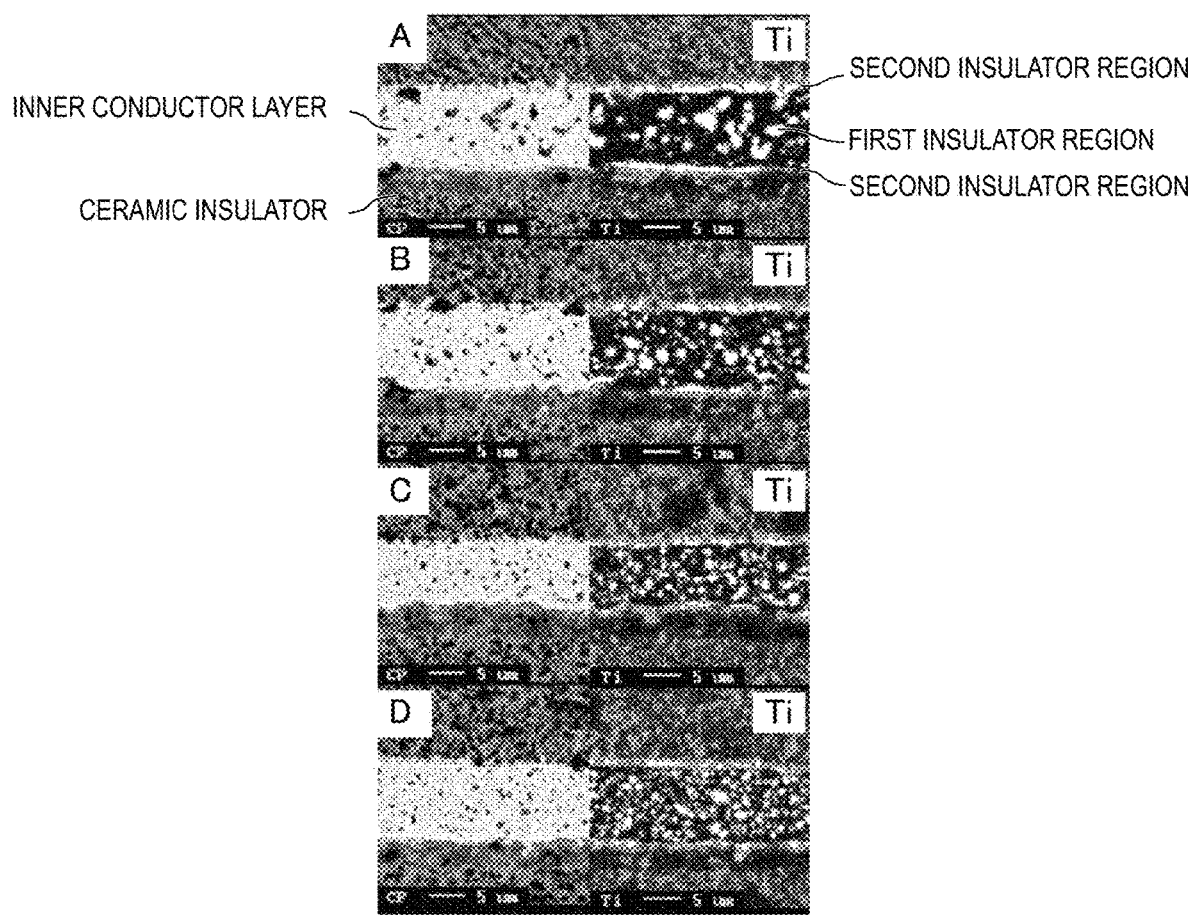
FIG. 4, part A illustrates a reflected electron image and an element Ti mapping image of the vicinity of an inner conductor layer of a ceramic electronic component S-1.

FIG. 4, part A illustrates a reflected electron image and an element Ti mapping image of the vicinity of an inner conductor layer of the ceramic electronic component S-1. FIG. 4, part B illustrates a reflected electron image and an

TABLE 4

| Conductive paste number | Composition [weight %] | | | | | | | | | | | | | | Organic vehicle | $D_{MSO}/D_{Osf}$ |
|---|---|---|---|---|---|---|---|---|---|---|---|---|---|---|---|---|
| | Metal powder | | | | | Metal oxide powder | | | | | | | | | | |
| | K-1 | K-2 | K-3 | K-4 | K-5 | OX-1 | OX-2 | OX-3 | OX-4 | OX-5 | OX-6 | OX-7 | OX-8 | OV-1 | |
| P-1 | 79.0 | — | — | — | — | 3.0 | — | — | — | — | — | — | — | 18.0 | 2.28 |
| P-2 | 79.0 | — | — | — | — | — | 3.0 | — | — | — | — | — | — | 18.0 | 7.59 |
| P-3 | 79.0 | — | — | — | — | — | — | 3.0 | — | — | — | — | — | 18.0 | 18.8 |
| P-4 | 79.0 | — | — | — | — | — | — | — | 3.0 | — | — | — | — | 18.0 | 33.3 |
| P-5 | — | 79.0 | — | — | — | — | — | 3.0 | — | — | — | — | — | 18.0 | 25.0 |
| P-6 | — | — | 79.0 | — | — | — | — | 3.0 | — | — | — | — | — | 18.0 | 31.3 |
| P-7 | — | — | — | 79.0 | — | — | — | 3.0 | — | — | — | — | — | 18.0 | 59.4 |
| P-8 | — | — | — | — | 79.0 | — | — | 3.0 | — | — | — | — | — | 18.0 | 56.3 |
| P-9* | — | — | — | — | 79.0 | — | — | — | — | 3.0 | — | — | — | 18.0 | 58.1 |
| P-10* | — | — | — | — | 79.0 | — | — | — | — | — | 3.0 | — | — | 18.0 | 85.7 |
| P-11 | — | — | — | — | 79.0 | — | — | — | — | — | — | 3.0 | — | 18.0 | 54.5 |
| P-12 | — | — | — | — | 79.0 | — | — | — | — | — | — | — | 3.0 | 18.0 | 58.1 |
| P-13 | — | — | — | — | 79.0 | — | — | 2.5 | — | — | — | — | — | 18.5 | 56.3 |
| P-14 | — | — | — | — | 79.0 | — | — | 3.5 | — | — | — | — | — | 17.5 | 56.3 |
| P-15* | — | — | — | — | 79.0 | — | — | — | — | — | — | — | — | 21.0 | — |

*Out of the scope of the present invention

[Production of Ceramic Electronic Component]

The conductive pastes P-1 to P-15 were each used to form, by screen printing, a conductive paste film that is to be an inner conductor layer on the surface of a green sheet. A predetermined number of green sheets on which a conductive paste film was formed were laminated, sandwiched by green sheets on which a conductive pattern film was not formed, and subjected to pressure bonding to produce a raw multilayer body.

After that, in a reducing atmosphere, firing was performed at 800° C. to 1000° C. for 60 to 180 minutes to obtain a ceramic electronic component having a ceramic insulator in which an inner conductor layer was disposed. The obtained ceramic electronic components were given sample numbers S-1 to S-15, which correspond to the respective numbers of conductive pastes.

[Elemental Analysis by WDX]

The ceramic electronic components S-1 to S-15 were each polished by using a mechanical polisher to expose a cross-sectional surface thereof. The cross-sectional surface of each of the ceramic electronic components S-1 to S-15 was subjected to flat milling treatment and carbon coating treatment. An elemental analysis was performed by using a WDX (wavelength-dispersive X-ray spectroscopy) measuring apparatus (product name JXA-8530F, manufactured by JEOL LTD.).

element Ti mapping image of the vicinity of an inner conductor layer of the ceramic electronic component S-2. FIG. 4, part C illustrates a reflected electron image and an element Ti mapping image of the vicinity of an inner conductor layer of the ceramic electronic component S-3. FIG. 4, part D illustrates a reflected electron image and an element Ti mapping image of the vicinity of an inner conductor layer of the ceramic electronic component S-4. In each of FIG. 4, part A to FIG. 4, part D, the reflected electron image is on the left side, and the element Ti mapping image is on the right side.

As illustrated in FIG. 4, part A to FIG. 4, part D, in the ceramic electronic components S-1 to S-4, which have respective inner conductor layers formed of conductive pastes P-1 to P-4 each containing a $TiO_2$ powder contained as the metal oxide powder, it has been confirmed that first insulator regions discontinuous from the ceramic insulator are present in a dispersed state in the inner conductor layer and that a second insulator region is present around the inner conductor layer. In addition, it has been confirmed that, as the SSA (specific surface area) of the $TiO_2$ powder increases from FIG. 4, part A to FIG. 4, part D, in other words, as the particle diameter $D_{Osf}$ calculated from the specific surface area decreases, the size of the small regions, which are the first insulator regions, decreases.

Figure 5:
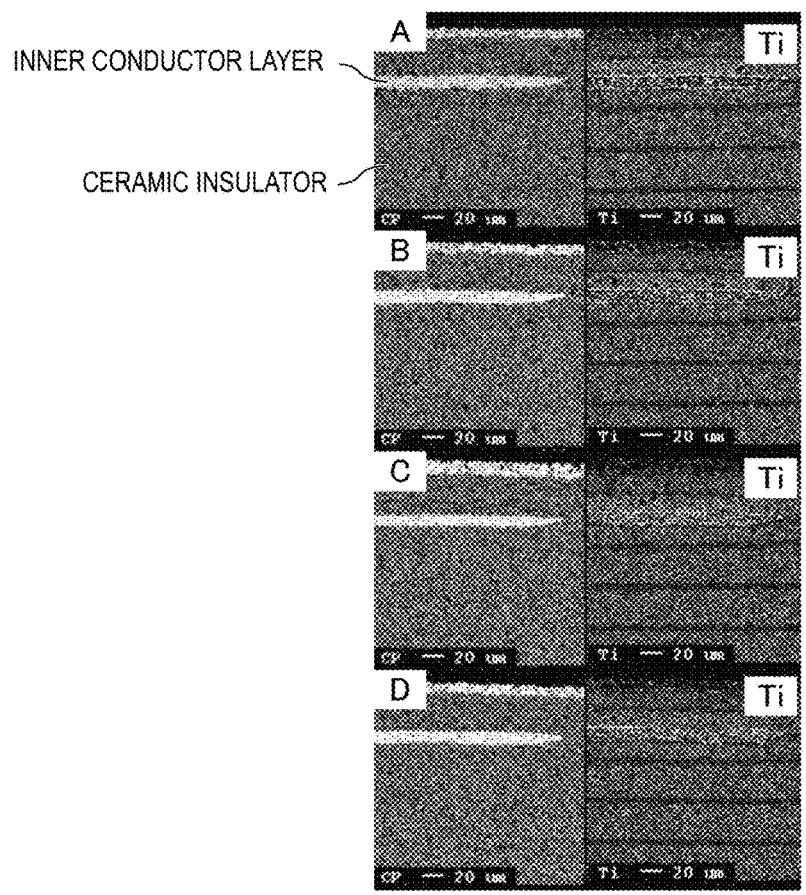
FIG. 5, part A illustrates a reflected electron image and an element Ti mapping image of the whole body of the ceramic electronic component S-1.

FIG. 5, part A illustrates a reflected electron image and an element Ti mapping image of the whole body of the ceramic electronic component S-1. FIG. 5, part B illustrates a reflected electron image and an element Ti mapping image of the whole body of the ceramic electronic component S-2. FIG. 5, part C illustrates a reflected electron image and an element Ti mapping image of the whole body of the ceramic electronic component S-3. FIG. 5, part D illustrates a reflected electron image and an element Ti mapping image of the whole body of the ceramic electronic component S-4. In each of FIG. 5, part A to FIG. 5, part D, the reflected electron image is on the left side, and the element Ti mapping image is on the right side.

In FIG. 5, part A to FIG. 5, part D, in common with FIG. 4, part A to FIG. 4, part D, it has been confirmed that first insulator regions discontinuous from the ceramic insulator are present in a dispersed state in the inner conductor layer and that a second insulator region is present around the inner conductor layer. On the other hand, it has been confirmed that the intensity of the element Ti in a region separated from the interface between the inner conductor layer and the second insulator region by 20 μm is lower than the that in the first insulator regions and the second insulator region. Thus, it has been found that the concentration of the element Ti contained in the ceramic insulator is lower than the concentration of the element Ti in the first insulator regions and the second insulator region.

Although not shown, in the ceramic electronic components S-5 to S-8 having respective inner conductor layers formed by using the conductive pastes P-5 to P-8, which differ in terms of the particle diameter of a Cu powder contained as the metal powder, and ceramic electronic components S-13 and S-14 having respective inner conductor layers formed by using the conductive pastes P-13 and P-14, which differ in terms of the amount of a $TiO_2$ powder contained as the metal oxide powder, it has been confirmed that first insulator regions discontinuous from the ceramic insulator are present in a dispersed state in the inner conductor layer and that a second insulator region is present around the inner conductor layer, in the same manner as in the ceramic electronic component S-3.

Figure 6:
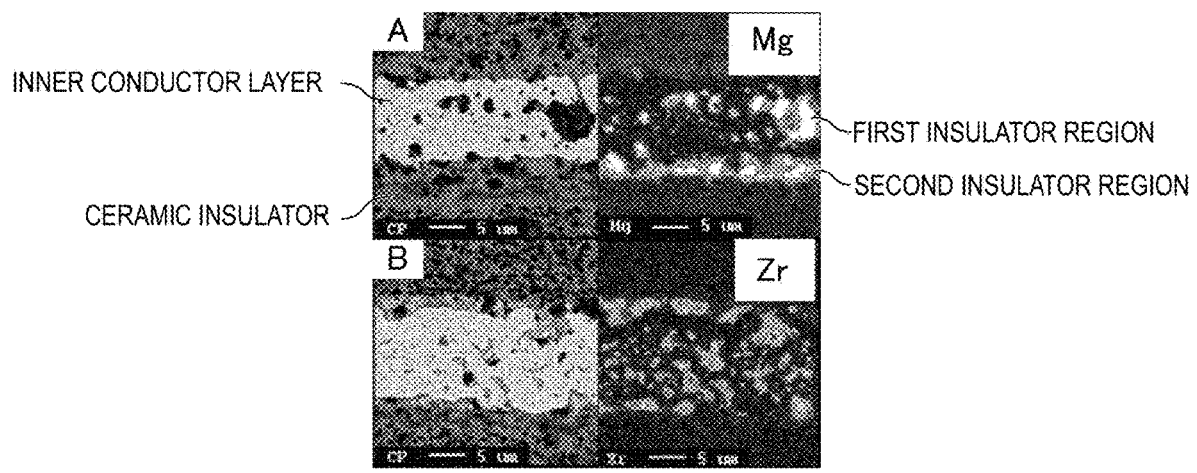
FIG. 6, part A illustrates a reflected electron image and an element Mg mapping image of the vicinity of an inner conductor layer of a ceramic electronic component S-11.

FIG. 6, part A illustrates a reflected electron image and an element Mg mapping image of the vicinity of an inner conductor layer of the ceramic electronic component S-11. FIG. 6, part B illustrates a reflected electron image and an element Zr mapping image of the vicinity of an inner conductor layer of the ceramic electronic component S-12. In each of FIG. 6, part A and FIG. 6, part B, the reflected electron image is on the left side, and the element Mg mapping image or the element Zr mapping image is on the right side.

As illustrated in FIG. 6, part A, in the ceramic electronic component S-11 having an inner conductor layer formed by using the conductive paste P-11 containing a MgO powder contained as the metal oxide and, as illustrated in FIG. 6, part B, in the ceramic electronic component S-12 having an inner conductor layer formed by using the conductive paste P-12 containing a $ZrO_2$ powder contained as the metal oxide powder, it has been confirmed that first insulator regions discontinuous from the ceramic insulator are present in a dispersed state in the inner conductor layer and that a second insulator region is present around the inner conductor layer, in the same manner as in the ceramic electronic components S-1 to S-4, although the second insulator region is partly absent around the inner conductor layer.

On the other hand, in the ceramic electronic component S-9 having an inner conductor layer formed by using the conductive paste P-9 containing an $Al_2O_3$ powder contained as the metal oxide powder and the ceramic electronic component S-10 having an inner conductor layer formed by using the conductive paste P-10 containing a $SiO_2$ powder contained as the metal oxide powder, it has been confirmed that neither first insulator regions nor a second insulator region was present. It has been assumed that the metal oxide powder contained in the conductive paste reacted with the material powder of the ceramic insulator. In the ceramic electronic component S-15 having an inner conductor layer formed by using the conductive paste P-15 containing no metal oxide powder, it has been confirmed that neither first insulator regions nor a second insulator region was present.

[Confirmation of Voids Generated between Inner Conductor Layer and Ceramic Insulator]

To confirm the presence of voids generated between the inner conductor layer and the ceramic insulator, each ceramic electronic component was vacuum-impregnated with a fluorescent solution and dried by using a dryer.

Then, the ceramic electronic component was polished by using a mechanical polisher until a surface including the inner conductor layer was exposed. The polished surface was observed by using a microscope equipped with a Hg light source, and whether ingress of the fluorescent solution between the inner conductor layer and the ceramic insulator occurred was observed.

Figure 7:
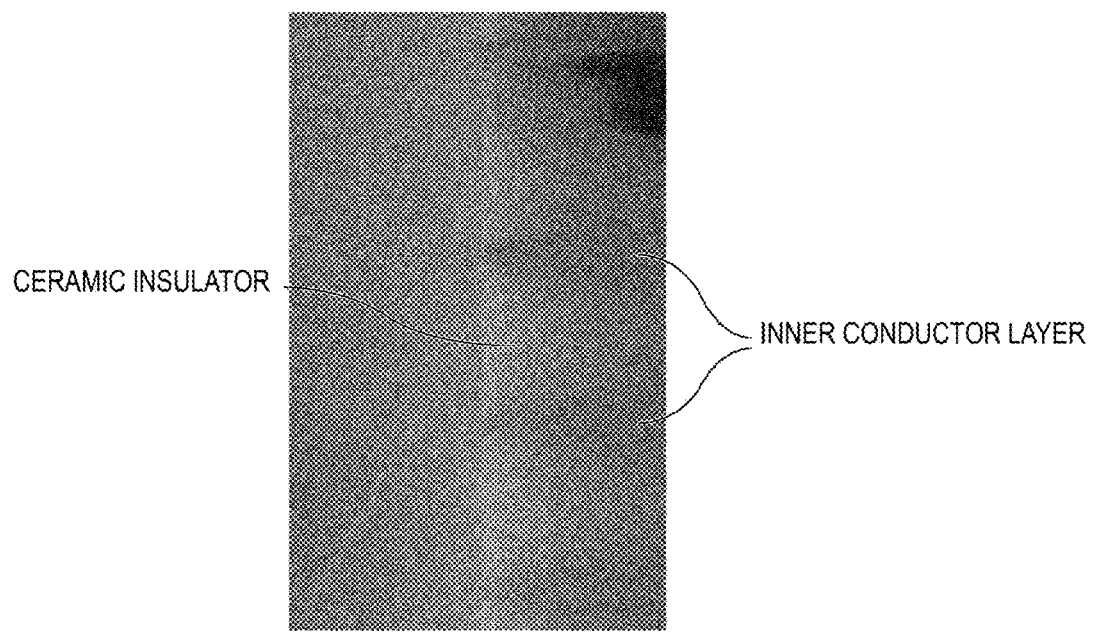
FIG. 7 is a photomicrograph of an exposed surface of the ceramic electronic component S-4.
Figure 8:
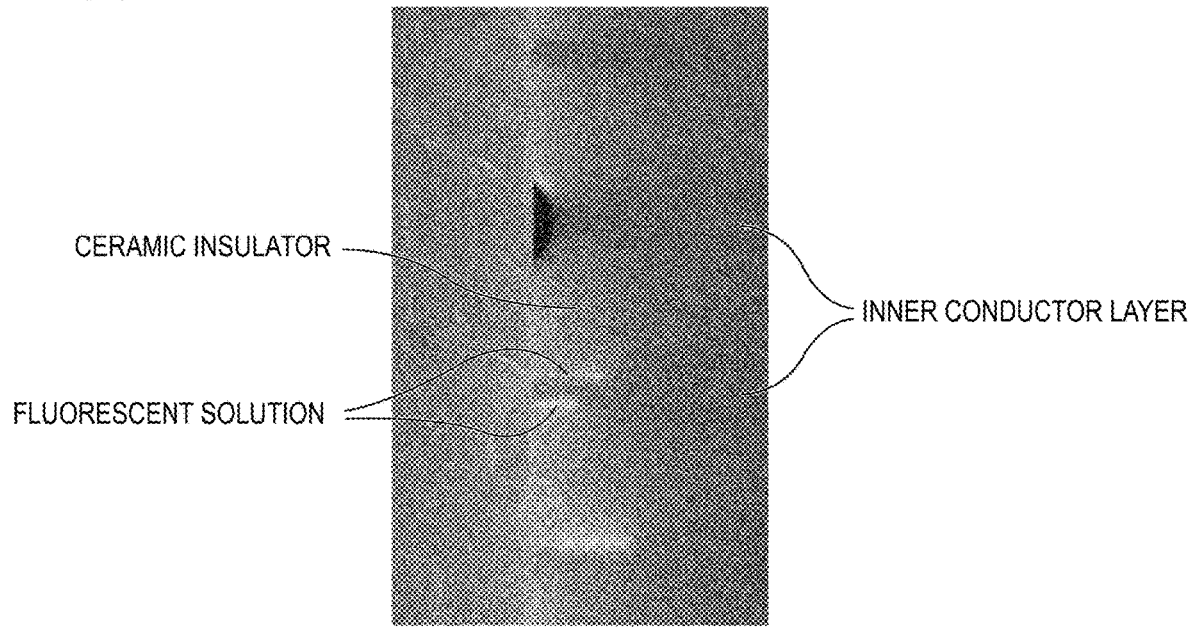
FIG. 8 is a photomicrograph of an exposed surface of a ceramic electronic component S-15.

FIG. 7 is a photomicrograph of the exposed surface of the ceramic electronic component S-4. FIG. 8 is a photomicrograph of the exposed surface of the ceramic electronic component S-15.

It has been confirmed that, in the ceramic electronic component S-4, in which first insulator regions and the second insulator region are present, ingress of the fluorescent solution occurs, as illustrated in FIG. 7. On the other hand, it has been confirmed that, in the ceramic electronic component S-15, in which neither first insulator regions nor a second insulator region is present, ingress of the fluorescent solution occurs, as illustrated in FIG. 8. From the results, forming first insulator regions and a second insulator region suppresses formation of voids between an inner conductor layer and a ceramic insulator.

REFERENCE SIGNS LIST

1: multilayer ceramic substrate (ceramic electronic component)
2: multilayer ceramic capacitor (ceramic electronic component)
11, 21, 31: ceramic insulator
12, 32: inner conductor layer
13, 14: outer conductor layer
15: via conductor
22a, 22b, 22c, 22d, 22e, 22f: inner layer electrode (inner conductor layer)
23a, 23b: outer electrode
41: first insulator region
42: second insulator region
43: a region having a thickness of 3 μm separated by 20 μm from the interface between an inner conductor layer and a second insulator region
44: the interface between an inner conductor layer and a second insulator region
A: a portion of the lower surface of an inner conductor layer that is in contact with the upper surface of the inner conductor layer

The invention claimed is:
1. A ceramic electronic component comprising:
a ceramic insulator; and an inner conductor layer disposed in the ceramic insulator, wherein the inner conductor layer contains a metal and a metal oxide containing at least one first metal element selected from a group consisting of Ti, Mg, and Zr;

first insulator regions that contain at least one second metal element selected from a group consisting of Ti, Mg, and Zr, the first insulator regions being discontinuous from the ceramic insulator and present in a dispersed state in the inner conductor layer; and a second insulator region containing a third metal element that is the same as the second metal element contained in the first insulator regions, the second insulator region located around the inner conductor layer, and wherein the second insulator region fully separates the inner conductor layer from the ceramic insulator.

2. The ceramic electronic component according to claim 1, wherein the ceramic insulator contains a fourth metal element that is the same as the second metal element contained in the first insulator regions and the third metal element contained in the second insulator region.

3. The ceramic electronic component according to claim 2, wherein a first concentration of the fourth metal element contained in the ceramic insulator is lower than a second concentration of the second metal element in the first insulator regions and a concentration of the third metal element in the second insulator region.

4. The ceramic electronic component according to claim 1, wherein the inner conductor layer is exposed at a surface of the ceramic insulator.

5. The ceramic electronic component according to claim 1, further comprising an outer conductor disposed on a surface of the ceramic insulator, wherein the inner conductor layer is electrically connected to the outer conductor.

6. The ceramic electronic component according to claim 1, a portion of a lower surface of the inner conductor layer that is in contact with an upper surface of the inner conductor layer contains a void having a length of 100 µm or less.

7. The ceramic electronic component according to claim 1, wherein the ceramic insulator contains a low temperature co-fired ceramic material.

8. The ceramic electronic component according to claim 1, wherein the metal contained in the inner conductor layer is selected from Au, Ag, Cu, Pt, Ta, W, Ni, Fe, Cr, Mo, Ti, Pd, and Ru and alloys thereof.

9. The ceramic electronic component according to claim 1, wherein the second insulator region is present around the inner conductor layer.

10. A method for producing a ceramic electronic component, the method comprising:
preparing a plurality of green sheets containing a ceramic material powder;
forming a conductive paste film by applying a conductive paste to a main surface of at least one of the plurality of green sheets, the conductive paste containing a metal powder, a metal oxide powder or a metal oxide precursor powder, and an organic vehicle, the metal oxide powder or the metal oxide precursor powder containing at least one first metal element selected from a group consisting of Ti, Mg, and Zr;
producing a raw multilayer body in which the conductive paste film is located between adjacent green sheets of the plurality of green sheets when the plurality of green sheets are laminated; and
firing the raw multilayer body to produce a ceramic electronic component having;
a ceramic insulator; and
an inner conductor layer disposed in the ceramic insulator, wherein the inner conductor layer contains a metal and a metal oxide containing the at least one first metal element selected from the group consisting of Ti, Mg, and Zr;
first insulator regions that contain at least one second metal element selected from a group consisting of Ti, Mg, and Zr, the first insulator regions being discontinuous from the ceramic insulator and present in a dispersed state in the inner conductor layer; and
a second insulator region containing a third metal element that is the same as the second metal element contained in the first insulator regions, the second insulator region located around the inner conductor layer, and wherein the second insulator region fully separates the inner conductor layer from the ceramic insulator.

11. The method for producing a ceramic electronic component according to claim 10, wherein the metal oxide powder or the metal oxide precursor powder has a specific surface area of 6 $m^2/g$ to 90 $m^2/g$.

12. The method for producing a ceramic electronic component according to claim 10, wherein $2.28 \leq D_{M50}/D_{Osf} \leq 105.5$, where $D_{Osf}$ represents a particle diameter calculated from a specific surface area of the metal oxide powder or the metal oxide precursor powder and $D_{M50}$ represents a volume-based median diameter of the metal powder.

13. The method for producing a ceramic electronic component according to claim 12, wherein $18.8 \leq D_{M50}/D_{Osf} \leq 105.5$.

14. The method for producing a ceramic electronic component according to claim 10, wherein an initial sintering temperature of the metal powder is equal to or lower than an initial sintering temperature of the plurality of green sheets.

15. The method for producing a ceramic electronic component according to claim 10, wherein the ceramic material powder contains $SiO_2$, $Al_2O_3$, and a Ba compound.

16. The method for producing a ceramic electronic component according to claim 10, wherein an amount of the metal oxide powder or the metal oxide precursor powder in the conductive paste is 1.5 weight% to 4.0 weight%.

17. The method for producing a ceramic electronic component according to claim 10, further comprising forming an outer conductor on a surface of the ceramic electronic component, and electrically connecting the outer conductor to the inner conductor layer.

18. The method for producing a ceramic electronic component according to claim 10, wherein the metal powder contained in the conductive paste is selected from Au powder, Ag powder, Cu powder, Pt powder, Ta powder, W powder, Ni powder, Fe powder, Cr powder, Mo powder, Ti powder, Pd powder, and Ru powder and alloy powders thereof.

19. The method for producing a ceramic electronic component according to claim 10, wherein the ceramic material powder is a low temperature co-fired ceramic material.

20. The method for producing a ceramic electronic component according to claim 10, wherein the second insulator region is present around the inner conductor layer.

* * * * *